(12) United States Patent  
Degler

(10) Patent No.: US 8,256,592 B2
(45) Date of Patent: Sep. 4, 2012

(54) WET CLUTCH

(75) Inventor: Mario Degler, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 477 days.

(21) Appl. No.: 12/465,151

(22) Filed: May 13, 2009

(65) Prior Publication Data

US 2009/0283378 A1 Nov. 19, 2009

(30) Foreign Application Priority Data

May 16, 2008 (DE) .......................... 10 2008 023 867

(51) Int. Cl.
*F16D 13/64* (2006.01)
*F16H 45/02* (2006.01)

(52) U.S. Cl. .................. 192/3.29; 192/52.6; 192/107 C

(58) Field of Classification Search ................ 192/3.29, 192/3.3, 52.6, 107 C, 109 F, 85.4, 85.39, 192/85.43

See application file for complete search history.

(56) References Cited

U.S. PATENT DOCUMENTS

| 1,956,828 A * | 5/1934 | Fink .......................... 192/107 C |
|---|---|---|
| 4,445,607 A * | 5/1984 | Knight ...................... 192/107 C |
| 4,714,148 A * | 12/1987 | Alas et al. .................. 192/107 C |
| 4,869,356 A * | 9/1989 | Cameron .............. 192/107 C X |
| 5,794,754 A * | 8/1998 | Villata .................. 192/107 C X |
| 5,857,551 A * | 1/1999 | Yoneda ...................... 192/107 C |
| 5,927,460 A * | 7/1999 | Ament ...................... 192/107 C |
| 6,015,035 A * | 1/2000 | Mizukami ................. 192/107 C |
| 6,016,897 A * | 1/2000 | Bacher |
| 6,279,712 B1 * | 8/2001 | Busse et al. ................ 192/107 C |
| 6,699,131 B2 * | 3/2004 | Jackel et al. |
| 6,699,132 B2 * | 3/2004 | Friedmann et al. |
| 6,832,673 B2 * | 12/2004 | Baumann et al. ............ 192/3.29 |
| 7,513,345 B2 * | 4/2009 | Karamavruc ................ 192/3.29 |
| 7,607,525 B2 * | 10/2009 | Vatin et al. ................. 192/107 C |
| 7,789,210 B2 * | 9/2010 | Hamaya et al. |
| 2007/0246317 A1 * | 10/2007 | Tomiyama ................... 192/3.29 |
| 2008/0060899 A1 * | 3/2008 | Vatin et al. ............ 192/107 C X |
| 2008/0210513 A1 * | 9/2008 | Dumas et al. .............. 192/107 C |

* cited by examiner

*Primary Examiner* — Gregory Binda
*Assistant Examiner* — Matthieu Setliff
(74) *Attorney, Agent, or Firm* — Simpson & Simpson, PLLC

(57) ABSTRACT

A wet clutch and to a hydrodynamic torque converter with a respective wet clutch as converter lockup clutch. In order to provide a good response of the wet clutch, the support elements for the friction surfaces and for the opposite friction surfaces of the wet clutch are axially supported relative to one another, at least over a partial portion of the actuation travel of the wet clutch.

7 Claims, 4 Drawing Sheets

WET CLUTCH

CROSS-REFERENCE TO RELATED APPLICATIONS

The present application claims priority from German Patent Application No. 10 2008 023 867.8, filed on May 16, 2008 which application is incorporated herein by reference.

The invention relates to a wet clutch with friction elements and opposite friction elements provided on support components, which clutch is closed through approximation of said friction elements, and the invention also relates to a hydrodynamic torque converter with such a wet clutch.

Such wet clutches and torque converters with respective wet clutches, which are mostly used as so-called torque converter lockup clutches, are known from drive trains of motor vehicles. Said wet clutches are actuated by an axially moving piston, which is loaded with pressure means, by one or plural friction disks with friction surfaces being pressed against respective stop surfaces or opposite friction disks with opposite friction surfaces by the axially moving piston, wherein a frictional engagement is provided between the friction surfaces on the input side and the friction surfaces on the output side. Due to the behavior of the piston under pressure in combination with the pressure conditions occurring in the operating area of the wet clutch, it can occur that a too quick engagement, this means, placement of the friction surfaces and the opposite friction surfaces against one another, or a delayed opening of the wet clutch cause a comfort reduction of the shifting operation of the wet clutch, in particular when interacting with a torque converter, and possibly causes increased wear.

Therefore, it is the object of the invention to provide an improvement for existing wet clutches, in particular for increasing the comfort and possibly to provide a wear reduction.

The object is accomplished by a wet clutch comprised of an input component with at least one friction surface and an output component with at least one opposite friction surface, wherein the wet clutch is closed by axial approximation of at least one friction surface and at least one opposite friction surface by forming a frictional engagement between the both of them, the at least one friction surface and the at least one opposite friction surface are placed onto one respective support component, and the support components are elastically supported relative to one another at least over a partial portion of their axial travel during the actuation of the wet clutch. The axially elastic support quasi forms an opposite force relative to the application force of the piston, and thus preferably in a travel range where the friction liners start to form a frictional engagement with the opposite friction surfaces. The wet clutch is then closed while being controlled by the spring force of the elastic application, and remains closed by maintaining the pressure at the piston. When the pressure is released and e.g. a suction occurs, which can impede the frictional engagement between the friction surfaces and the opposite friction surfaces, the frictional engagement is loaded with force through the elastic preload of the friction surfaces and of the opposite friction surfaces towards one another, and reliably separated.

In the simplest case, a wet clutch can be configured from a piston as a support component of an opposite friction surface, which is connected with a drive component as an output component of the friction clutch, e.g. with a transmission input shaft or a turbine hub of a torque converter, and thus forms a frictional engagement with a friction surface provided at an input component of the wet clutch, e.g. of a wall section of a housing of a torque converter as a support component. Thus, one or plural axial energy accumulators can be disposed between the piston and the wall section, which establish an opposite force when moving the opposite friction surface towards the friction surface. It is appreciated that the spring constant of the axially operating energy accumulators of said embodiment and of the subsequent embodiment are comparatively small compared to the compression force for assuring the transmission of the desired clutch moment.

Another embodiment can provide a wet clutch in the form of a disk clutch, in which at least one friction disk as support component comprises friction surfaces on both sides, which form a frictional engagement with one respective stop surface as a contact component of the opposite friction surfaces. Thus, a friction surface can be formed directly by a pressure loaded piston, which presses the friction disk against an axial stop surface, while forming a frictional engagement. For example for transmitting a higher torque or the same torque on a smaller friction diameter through the wet clutch, plural friction disks received torque proof on the input side, e.g. on a disk support, which friction disks comprise friction surfaces on both sides, can be disposed alternating with friction disks received on the output side on a disk support, which friction disks are disposed with opposite friction surfaces on both sides. Thus, it can be sufficient when one of the input side support components like a friction disk is axially elastically clamped relative to an adjacent output side support component like a friction disk. Advantageously, plural or all input side support components can be axially clamped with respect to the other respective support component.

It has proven to be particularly advantageous, when at least one support component is divided in radial direction into two support elements with one respective friction liner with an opposite friction surface and both support elements are axially preloaded relative to one another at the sides facing away from the sides bearing the friction surfaces. For this purpose, at least one axially effective energy accumulator can be provided.

In an advantageous manner, at least one axially operating energy accumulator can be integrally configured from at least one of the support components or support elements between the support components or between the so-called elements, and said energy accumulator can be supported at the other respective support component or support element. In a particularly advantageous manner, the at least one axially effective energy accumulator can be deflected from the material of a support component or of a support element. Thus, a circumferentially oriented tongue is deflected and bent forward in axial direction. The tongues can e.g. comprise a bulge or they can be angled in axial direction at their free end. In order to implement the tongues, a separation line can first be drawn in slightly radially inward direction, and subsequently in circumferential direction at the outer circumference of the support component or of the support element, and subsequently the tongue can be axially formed accordingly. The support component or the support element can be e.g. inductively hardened or case hardened at least partially in the portion of the tongue in order to implement sufficient elasticity. In particular for the mutual axial elastic preloading of input side and output side support components, circumferentially oriented tongues are suitable, wherein the tongues are oriented in rotation direction of the relative rotation of input and output component of the wet clutch, so that a deflection of the tongues is unlikely. When support elements are axially preloaded relative to one another, radially extending tongues can be used alternatively or additionally, which are deflected from the support element accordingly, so that e.g. the free end of a tongue ends at the outer circumference. Due to the torque proof reception of the support elements on a common disk carrier, they do not rotate relative to one another.

The at least one axially effective energy accumulator can be formed from plural energy accumulator units distributed over the circumference. The energy accumulator is advantageously disposed at the surfaces of the support components or support elements without liners and it engages surfaces without liner of the support component or of the contact element engaging said accumulator. It has proven advantageous to configure the respective support components or support elements with a larger diameter at their inner and/or outer circumference than the friction surfaces, which can be formed by friction liners, like e.g. glued on paper liners.

The axially effective energy accumulators can be disposed at a support element or at a contact element, wherein another support element or an adjacent contact element loaded by said accumulator only comprises contact surfaces for said energy accumulators. Alternatively, both support elements or support components can comprise axially operating energy accumulators, so that both support components or support elements comprise respective contact surfaces for the corresponding energy accumulators. Thus, the energy accumulators associated with the different support components or support elements can be disposed radially outside or radially inside of the friction surfaces or of the opposite friction surfaces and they can be distributed about the circumference, e.g. by alternating about the circumference.

The suggested wet clutch is suited in particular for a hydrodynamic torque converter with a pump shell driving a turbine shell, and possibly a stator shell. The torque converter thus provides the wet clutch as a so called torque converter lockup clutch, which bridges the torque flow through the pump shell and turbine shell when closed.

The invention is described in more detail with reference to the embodiments illustrated in the FIGS. 1 through 5, wherein.

Figure 1:
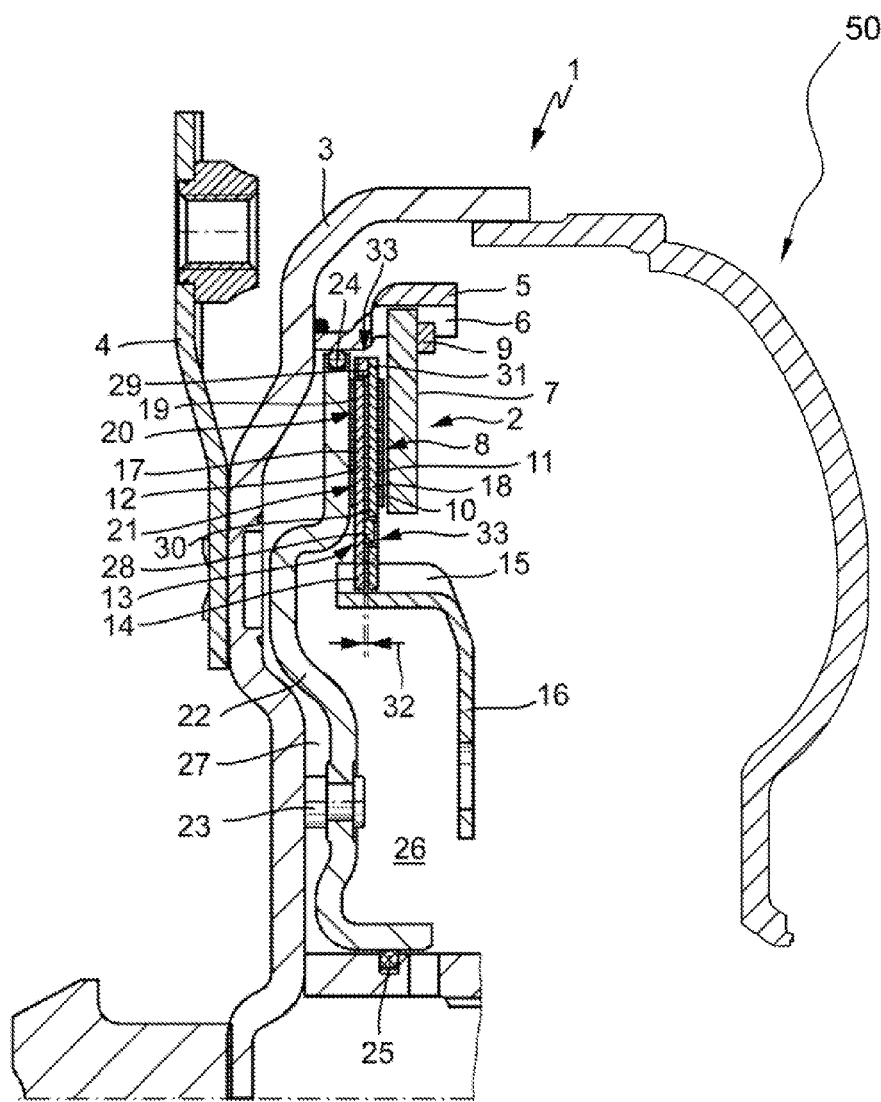
FIG. 1 shows a partial sectional view of a torque converter with a wet clutch with a friction disk formed from support elements.

FIG. 1 shows a hydrodynamic torque converter 1 with a wet clutch 2, which is received in the converter housing 3 as a converter lockup clutch. The converter housing 3 is driven by an internal combustion engine, which is not shown, through the drive plate 4. Housing 3 is connected to pump shell 50. An input component 5 of the wet clutch 2 is connected to the converter housing 3 torque proof, e.g. welded together as illustrated. The input component 5 comprises a circumferential profile 6, into which an annular component 7 is engaged torque proof by a friction surface 8, and engaged axially fixated by the safety 9. The friction surface 8 corresponds with the opposite friction surface 10 of the friction liner 11, for which the friction disk 12 is used as a support component 13. The support component 13 is engaged through an inner profile 14, like e.g. an inner teething, in an outer profile 15, like an outer teething of the output component 16 and centered. The output component 16 is permanently connected with an input component in a manner which is not shown. The input component can be a torsion vibration damper, whose output component can be directly connected with the transmission input shaft or with the turbine hub, which also receives the turbine.

In the illustrated embodiment, the support component 13 is formed in two components from support elements 17, 18, which are placed against one another, and which respectively receive a friction liner 11, 19 on the opposite side. The friction liners 11, 19 can be so-called paper liners, ceramic- or sinter liners or similar, which are preferably glued together with the support elements 17, 18. The two support elements 17, 18 are disposed substantially torque proof relative to one another through an identically configured inner teething 14 at both support elements.

The friction liner 19 of the support element 17 with its opposite friction surface 20 forms a frictional engagement with the input side friction surface 21 of the piston 22 when the wet clutch 2 is closed, which piston 22 is connected torque proof to the converter housing 3 by means of the rivets 23 and by means of non-illustrated leaf springs.

The piston 22 seals the pressure chamber 27 relative to the converter chamber 26 on the radial inside and on the radial outside by means of seals 24, 25. When the pressure chamber 27 is loaded with pressure through one or plural openings, which are not visible in said sectional view, the piston 22 moves axially in the direction of the friction liner 12 and brings the friction surfaces 8, 21 of the annular component 7 or of the piston 22 in operative engagement with the opposite friction surfaces 10, 20 of the friction liners 11, 19.

Tongues 28, 29 are deflected in circumferential direction from both support elements 17, 18, which tongues axially load the opposite support element 17, 18. In the illustrated embodiment, one or plural tongues 29 distributed about the circumference are deflected at the support element 17 radially outside of the friction liner 19, which load a contact surface 31, corresponding thereto, as soon as the tongues 29 and the contact surface 31 come into contact with one another during the closing process of the wet clutch 2 caused by an axial movement of the piston 22 against the effect of the leaf springs mounted at the rivets 23. In the same way, one or plural tongues 28 distributed over the circumference are deflected, which are disposed at the support element 18 radially within the friction liner 11, which tongues come into contact with contact surfaces 30 provided at the support element 17. When the tongues 28, 29 are deflected in the same way, a spring travel 32 is established, when said tongues contact the contact surfaces 30, 31, over which spring travel the axial force of the tongues 28, 29, which respectively form axially operating energy accumulators 33, is effective when the wet clutch 2 closes further. When the tongues 28, 29 are provided with different deflection distances, multistage spring characteristics can be provided over the actuation travel. For example, the tongues 28, 29 of a support element 17, 18 can be provided with different deflection paths alternating over the circumference, or all tongues 28, 29 of a support element can be provided with identical deflection paths, wherein the deflection paths of the tongues 28, 29 of the two support elements 17, 18 differ.

The closed wet clutch 2 is opened through reduction of the pressure of the pressure chamber 27 below a pressure provided in the converter chamber 26. Thus, the axially operating energy accumulators 33 under axial preload provide for a continuous disengagement of the opposite friction surfaces 10, 20 from the friction surfaces 8, 21. When the pressure is further reduced, the piston 22 is completely lifted off through the preload of the leaf springs operatively disposed between the rivets 23 and the converter housing 3.

Figure 2:
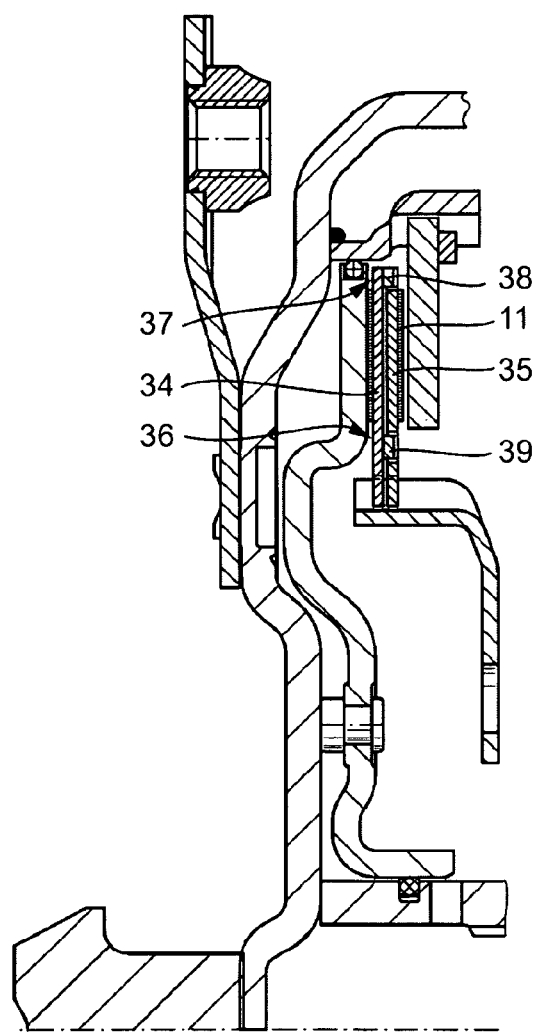
FIG. 2 shows the torque converter of FIG. 1 with a revised configuration of the support elements.

FIG. 2 shows similarly disposed support elements 34, 35, which differ from the support elements 17, 18 illustrated in FIG. 1. Different from said support elements in FIG. 1, the support element 34 is only provided with stop surfaces 36, 37, with which the tongues 38, 39 disposed radially within and radially outside of the friction liner 11 come into contact.

Figure 3:
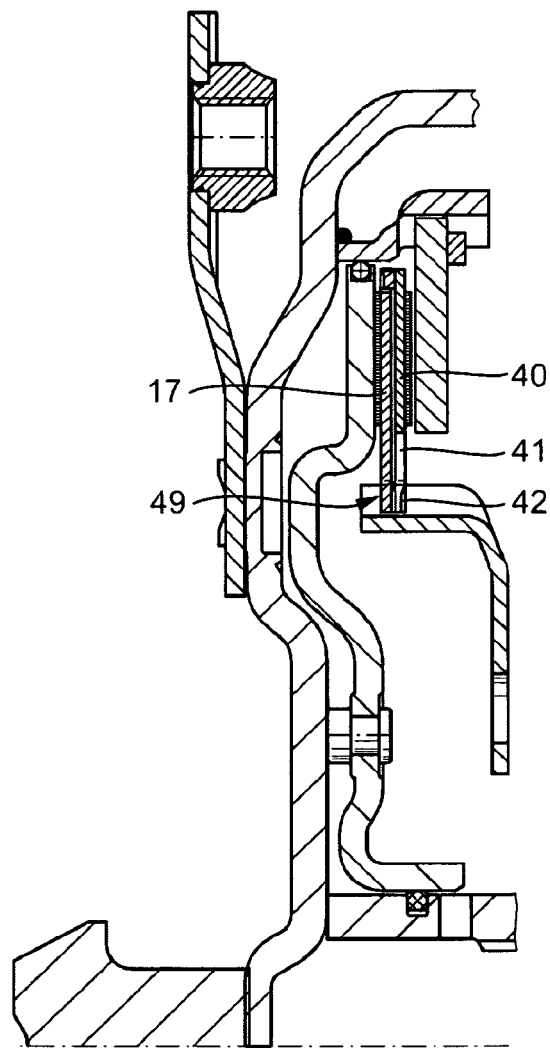
FIG. 3 shows the torque converter of FIG. 1 with a revised configuration of the support elements.

FIG. 3 shows a support element 40, which is configured similar to the support element 18 illustrated in FIG. 1 with a radially oriented tongue 41, which is deflected at the inner circumference of the support element 40 in the direction of the support element 17, starting with a free end 42, and formed by two radial incisions in radially outward direction. The support element 17 comprises a respective contact surface 49 for contacting the tongue 41.

Figure 4:
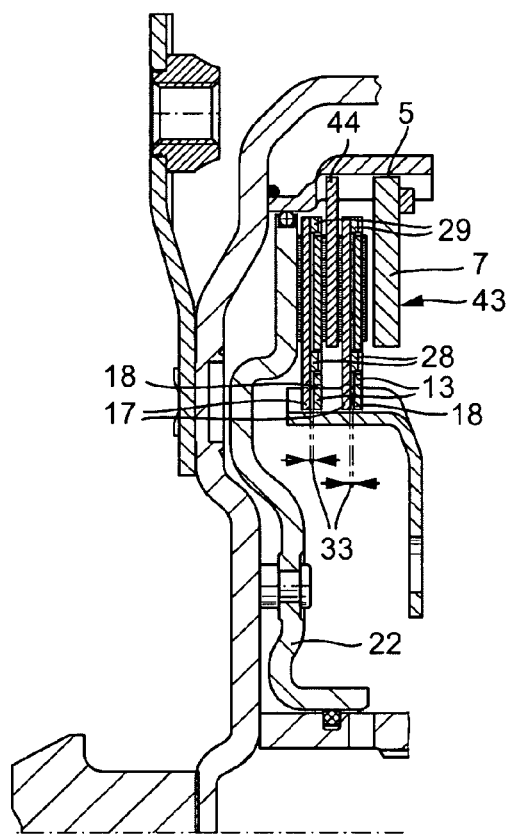
FIG. 4 shows a partial sectional view of a torque converter with a wet clutch with plural friction elements formed from support elements.

FIG. 4 shows a wet clutch 43 modified with respect to the wet clutch 2. Different from the wet clutch 2, an additional friction disk 44 is engaged with the input component 5 on the input side of the wet clutch 43, so that two support components 13 respectively comprised of two support elements 17, 18 on the output side can be brought into frictional engagement with the input components piston 22, friction liner 44 and ring component 7. The configuration of the tongues 28, 29 corresponds to the description of FIG. 1. Twice the spring travel is provided through the spring travels 33 of both support components 13. It is appreciated that the tongues 28, 29 are replaced by tongues with different configuration, and it is appreciated that different support components with a different configuration of the tongues can be provided.

Figure 5:
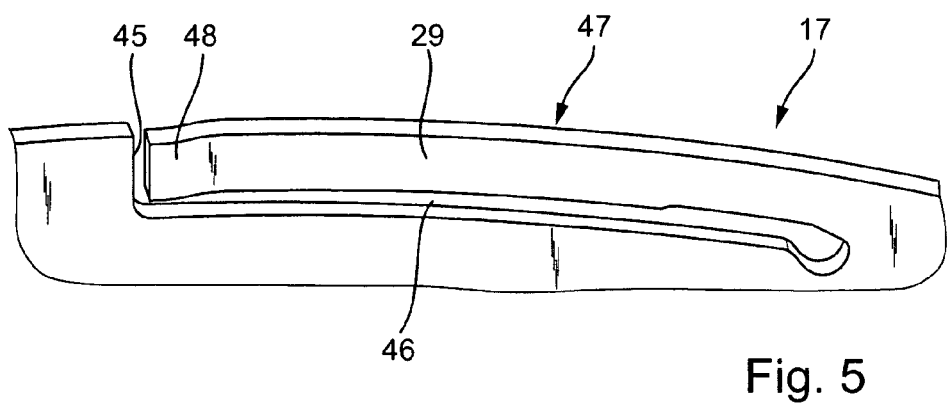
FIG. 5 shows a partial view of an axially operating energy accumulator configured as a tongue.

FIG. 5 shows a cutout from a support element, e.g. the support element 17 and the tongue 29 disposed radially about the outer circumference 29, which is formed by a radial cut 45 and by a cut 46 in circumferential direction. The tongue 29 is axially bent out in circumferential direction and forms a contact surface 47, which comes into contact with a support element adjacent to a support element 17, which comprises a contact surface complementary thereto. The free end 48 of the tongue 29 is deflected into the plane of the support element 17. Through a respective forming of the tongue 29, other contact surfaces with a respective softer or harder characteristic can be provided in axial direction. Furthermore, at least a partial hardening of the tongue 29 and of its surroundings, in particular in the portion of its receiver at the support element 17 is advantageous. Through the hardness, the spring characteristic can also be adapted to the requirements. Furthermore, the spring characteristic can be adjusted by the number of the tongues distributed about the circumference of the support element.

| Reference Numerals and Designations | |
|---|---|
| 1 | torque converter |
| 2 | wet clutch |
| 3 | converter housing |
| 4 | drive plate |
| 5 | input component |
| 6 | circumferential profile |
| 7 | ring component |
| 8 | friction surface |
| 9 | safety |
| 10 | opposite friction surface |
| 11 | friction liner |
| 12 | friction disk |
| 13 | support component |
| 14 | inner profile |
| 15 | outer profile |
| 16 | output component |
| 17 | support element |
| 18 | support element |
| 19 | friction liner |
| 20 | opposite friction surface |
| 21 | friction surface |
| 22 | piston |
| 23 | rivet |
| 24 | gasket |
| 25 | gasket |
| 26 | converter chamber |
| 27 | pressure chamber |
| 28 | tongue |
| 29 | tongue |
| 30 | contact surface |
| 31 | contact surface |
| 32 | spring travel |
| 33 | energy accumulator |
| 34 | support element |
| 35 | support element |
| 36 | contact surface |
| 37 | contact surface |
| 38 | tongue |
| 39 | tongue |
| 40 | support element |
| 41 | tongue |
| 42 | stop surface |
| 43 | wet clutch |
| 44 | friction disk |
| 45 | cut |
| 46 | cut |
| 47 | contact surface |
| 48 | end |
| 49 | stop surface |

What is claimed is:

1. A wet clutch, comprising:

a piston;

a reaction plate;

an output component;

at least one first support element connected to the output component so as to rotate with the output component and including an outer circumferential edge, and at least one first resilient tongue forming at least a portion of the outer circumferential edge of the at least one first support element, the at least one first tongue including a portion separate from a remaining portion of the at least one first support element in a radial direction by a circumferentially extending opening passing through the at least one first support element, the circumferentially extending opening in communication with the outer circumferential edge by a radial slot, passing through the at least one first support element, extending into said first support component from the outer circumferential edge;

at least one second support element connected to the output component so as to rotate with the output component and including at least one second resilient tongue located radially inward of the at least one first tongue, the at least one second tongue including a portion separate from the at least one second support element in the radial direction;

at least one first friction liner fixed to the at least one first support element on a side of the at least one first support element facing in a first axial direction; and, at least one second friction liner fixed to the at least one second support element on a side of the at least one second support element facing in a second axial direction, opposite the first axial direction, wherein:

the at least one first and second tongues are misaligned in the first and second axial directions; and, to close the wet clutch, the piston plate is arranged to axially displace the at least one first and second support elements such that the at least one first friction liner engages one of the piston plate or the reaction plate and the at least one second friction liner engages the other of the piston plate or the reaction plate.

2. The wet clutch according to claim 1, wherein:

the at least one first support element includes a plurality of first support elements;

the at least one second support element includes a plurality of support elements;

the at least one first friction liner includes a plurality of first friction liners fixed to the plurality of first support elements; and, the at least one second friction liner includes a plurality of second friction liners fixed to the plurality of second support elements.

3. The wet clutch according to claim 1, wherein the at least one first and second resilient tongues are in contact with the second and first support elements, respectively.

4. The wet clutch according to claim 1, wherein the at least one first or second tongue is located radially inward of the first or second friction liner.

5. previously presented The wet clutch according to claim 1, wherein the at least one first or second tongue is located radially outward of the first or second friction liner.

6. A hydrodynamic torque converter with a pump shell driving a turbine shell and a wet clutch according to claim 1, which can be engaged with the drive of the turbine shell and which bridges the torque flow through the pump shell and the turbine shell.

7. A wet clutch, comprising:

a piston;

a reaction plate;

an output component;

a first support element connected to the output component so as to rotate with the output component and including at least one first resilient tongue forming at least a portion of an outer circumference of the first support element, the at least one first tongue including a portion separate from a remaining portion of the first support element in a radial direction by a circumferentially extending opening passing through the at least one first support element, the circumferentially extending opening in communication with the outer circumferential edge by a radial slot, passing through the at least one first support element, extending into said first support component from the outer circumferential edge;

a second support element connected to the output component so as to rotate with the output component and including at least one second resilient tongue radially located inward of the at least one first tongue, the at least one second tongue including a portion separate from the second support element in the radial direction;

a first friction liner fixed to the first support element on a side of the first support element facing in a first axial direction; and, a second friction liner fixed to the second support element on a side of the second support element facing in a second axial direction, opposite the first axial direction, wherein:

the at least one first tongue:

is in contact with the second support element at a location other than the at least one second tongue; and, urges the second support element in the second axial direction;

the at least one second tongue:

is in contact with the first support element at a location other than the at least one first tongue; and, urges the first support element in the first axial direction; and, to close the wet clutch, the piston plate is arranged to axially displace the first and second support elements such that the first friction liner engages one of the piston plate or the reaction plate and the second friction liner engages the other of the piston plate or the reaction plate.

* * * * *